United States Patent
Chretiennot

[11] 3,765,666
[45] Oct. 16, 1973

[54] ASSEMBLING SUPPORT
[75] Inventor: Michel Jean Jules Chretiennot, Triel, France
[73] Assignee: Chrysler France, Paris, France
[22] Filed: Feb. 1, 1971
[21] Appl. No.: 111,242

[30] Foreign Application Priority Data
Jan. 30, 1970   France ............................... 7003433

[52] U.S. Cl. .................... 269/37, 248/351, 269/289
[51] Int. Cl. ............................................. B23q 3/00
[58] Field of Search .................... 248/158, 351, 357; 269/289, 37

[56] References Cited
UNITED STATES PATENTS
| | | | |
|---|---|---|---|
| 1,653,126 | 12/1927 | Schwerin | 248/351 X |
| 2,430,027 | 11/1947 | Morrison | 248/351 UX |
| 2,456,480 | 12/1948 | Austin | 248/351 |
| 1,015,183 | 1/1912 | Hering | 248/165 |

Primary Examiner—William H. Schultz
Attorney—Steinberg & Blake

[57] ABSTRACT

Assembling support for fixing two assemblies in desired positions and directions relative to each other in view of subsequent joining of the said assemblies to other parts or to each other.

According to the invention the fixture comprises a tube at each end of which is welded a ball member fixed with a plate provided with means for temporarily fastening the said assemblies respectively to the plates.

8 Claims, 14 Drawing Figures

Patented Oct. 16, 1973  3,765,666

Patented Oct. 16, 1973

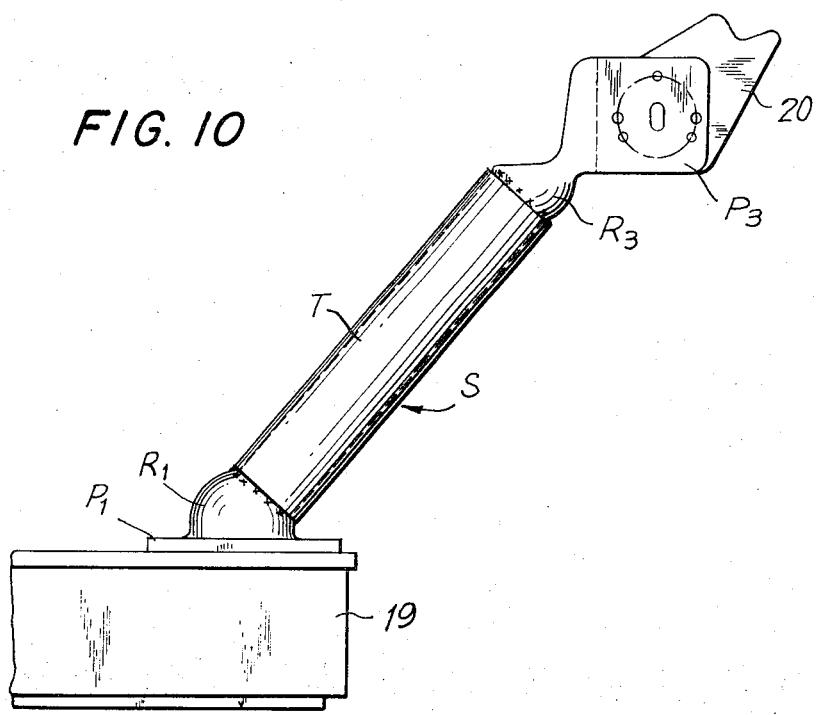
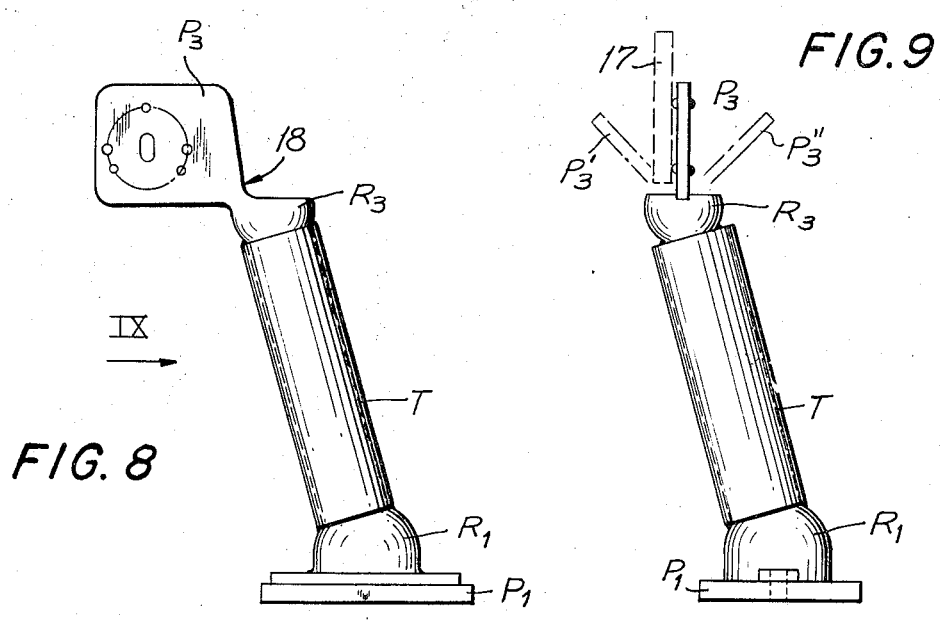

ASSEMBLING SUPPORT

The present invention has essentially for its object an assembling support such as a fixture for positioning two members, parts or assemblies to be fixed or secured in desired positions and directions.

Such supports or fixture are usually made from flat bars or for instance from U- or channel-bars which are cut and welded to one another, so as to provide, at each end, means enabling them to be joined or assembled to the two assemblies which they are intended to interconnect.

The manufacture of such fixtures is time-consuming, costly and of low accuracy. It requires the making of detailed drawings and complicated processing operations.

The subject matter of the invention is a novel fixture or assembling support, the construction of which is very easy, inexpensive, accurate and adapted to be readily standardized.

This aim is attained, according to the invention, owing to the fact that the fixture comprises at least one ball member or the like which is so mounted as to be fixed with one of the said assemblies and to which is secured, advantageously by welding, a tube, sleeve or the like forming a supporting spacer separating the two assemblies. Advantageously, the fixture comprises two ball members which are secured to both ends of the said tube. In a preferred embodiment, each said ball member is fixed with a plate which is provided with means enabling it to be fastened with the corresponding assembly.

In this manner, by using for instance a gauge apparatus, it is extremely easy to obtain a fixture which enables two assemblies or parts to be assembled in any required direction and position.

The invention will be better understood and other objects, characteristics and advantages thereof will appear as the following description proceeds, with reference to the appended drawings given solely by way of example illustrating several forms of embodiment of the invention and wherein:

FIG. 8 is a view similar to that of FIG. 1 and relating to a modified form of embodiment;

FIG. 9 is a side view according to the arrow IX of FIG. 8;

FIG. 10 illustrates an example of use of a support of the type shown in FIGS. 8 and 9;

According to the form of embodiment illustrated in FIGS. 1 to 7, an assembling support or fixture S according to the invention is essentially constituted by a tube T, the cross-section of which is substantially circular and to the ends of which are welded two members 10 and 11, respectively. The member 10 comprises essentially two portions, namely a ball portion $R_1$ and a plate portion $P_1$, the said two portions being formed, for instance, by moulding, pressing or stamping in a single piece.

Figure 7:
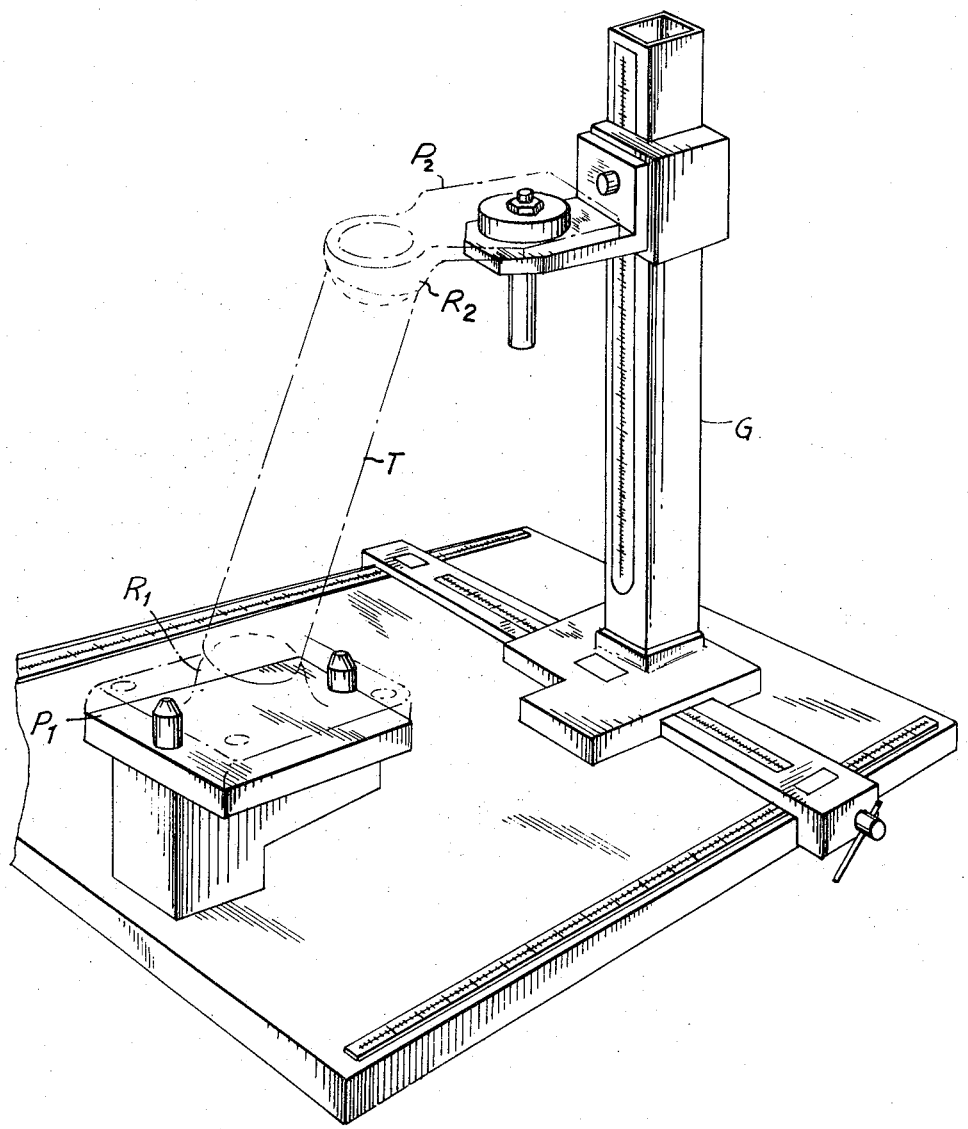
FIG. 7 is a gauge apparatus for the construction of a support of the type shown in FIG. 1.

Likewise, the member 11 comprises essentially two portions, namely a ball $R_2$ and a plate $P_2$, the said two members being integral with one another, for instance by moulding, pressing or stamping. It is obvious that owing to the fact that the balls $R_1$, $R_2$ respectively have exterior convex surfaces respectively forming parts of spheres each of which has a diameter greater than the diameter of the tube with these convex surfaces extending into the opposed open ends of the tube while the latter has at its opposed open ends circular edges respectively engaging along their entire lengths the exterior convex surfaces of the balls at an infinite number of inclinations of the tube with respect to each ball, the tube may be inclined at will, according to the indications read on the gauge apparatus G (FIG. 7). It is sufficient to cut the tube T to the desired length and to weld it, as seen in particular in FIG. 1 where the weld lines are shown at 12 and 13.

Accurate positioning of the plate on the assemblies to which they are to be fastened may be obtained, for instance, by providing projections 14, 15, 16 corresponding to the fastening plane (FIG. 1) enabling the assembly 17 to be accurately positioned.

As appears from the drawings, the plates are provided with standardized holes which enable them to be secured to the various assemblies.

In addition to simplifying the manufacture of such supports, the latter also offer the advantage of having very small overall dimensions.

Figure 1:
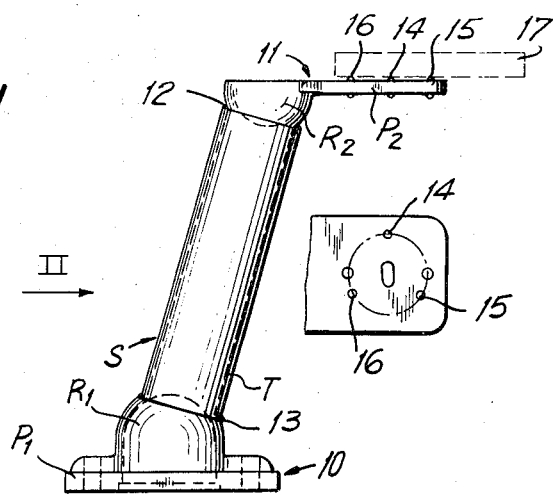
FIG. 1 is a side view of an assembling support forming a fixture designed according to the invention.
Figure 2:
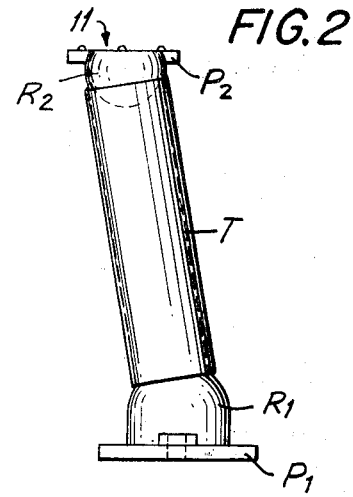
FIG. 2 is a view according to the arrow II of FIG. 1.

In the modified embodiment illustrated in FIGS. 8 and 9, a structure similar to that of the fixture of FIG. 1 is seen. However, in the fixture of FIGS. 8 and 9, the upper member 11 is replaced by a member 18 having a somewhat different shape, comprising a ball $R_3$ and a plate $P_3$. As seen in FIG. 9, the plate $P_3$ may be vertical or differently inclined, as shown at $P'_3$ and $P''_3$, instead of being horizontal as the plate $P_1$ of FIG. 1.

FIG. 10 illustrates the use of an assembling support S secured to a frame or chassis 19 and supporting an assembly 20 constituted for instance by a bracket or the like. Thus, the structure of the invention is of particular advantage in the mass production of articles, machines, or the like which have components which must first be positioned accurately with respect to each other before they are joined. Initially a number of fixtures according to the invention are made with tubes T of different lengths and with the several tubes extending at different angles with respect to the exterior convex surfaces of the ball members. Once a set of such fixtures is manufactured, the same set of fixtures can be used repeatedly during mass production of any desired machine. Thus, in the case of FIG. 10 the bracket 20 is positioned by the fixture S of the invention so as to be properly positioned for assembly with another component, and of course this bracket 20 will have a predetermined position relative to the chassis 19. Other fixtures having tubes of different inclinations and lengths and having any of the constructions described above may be used at different parts of the machine or the like which is being manufactured. After the assembly of the components of the machine or the like has been completed, the several fixtures of the invention are removed and are then used in the manufacture of further machines or the like.

Figure 11:
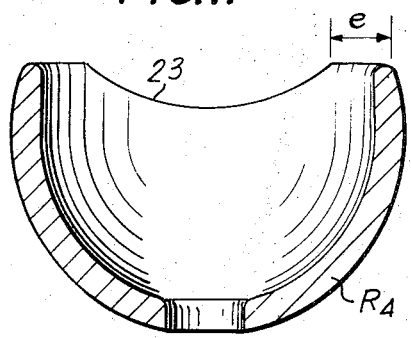
FIG. 11 is a sectional view of a ball constituting a member of an assembling support according to a modified form of embodiment.
Figure 13:
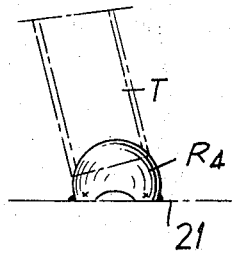
FIGS. 13 and 14 illustrate, to a smaller scale, examples of use of a ball of the type illustrated in FIGS. 11 and 12.
Figure 12:
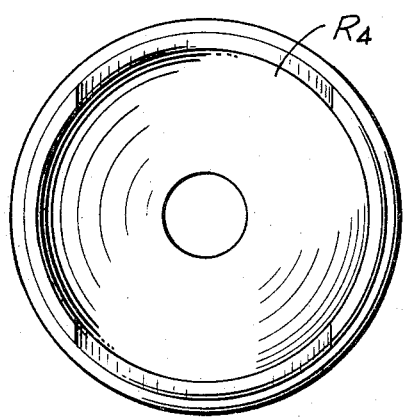
FIG. 12 is a top view of the ball of FIG. 11.
Figure 14:
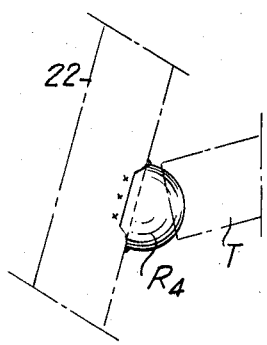
Figure 3:
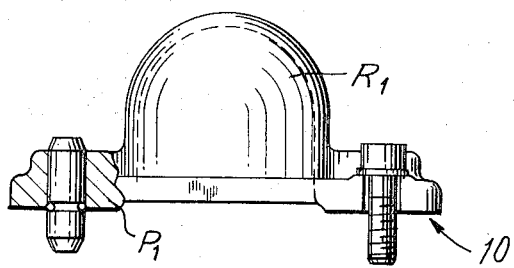
FIG. 3 is an external view, to a larger scale and partially broken away, of the lower plate-and-ball member of the assembling support of FIG. 1.
Figure 4:
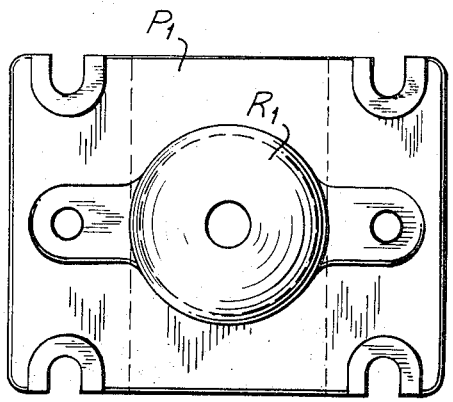
FIG. 4 is a top view of the plate-and-ball member of FIG. 3.
Figure 5:
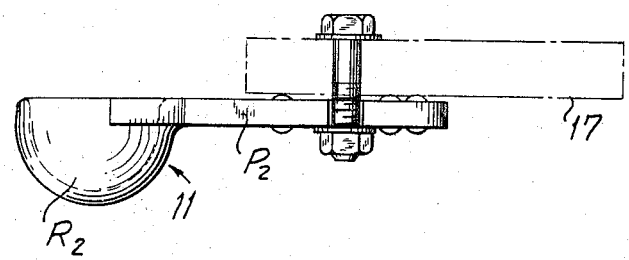
FIG. 5 shows, as in FIG. 3, the upper ball-and-plate member of the assembling support of FIG. 1.
Figure 6:
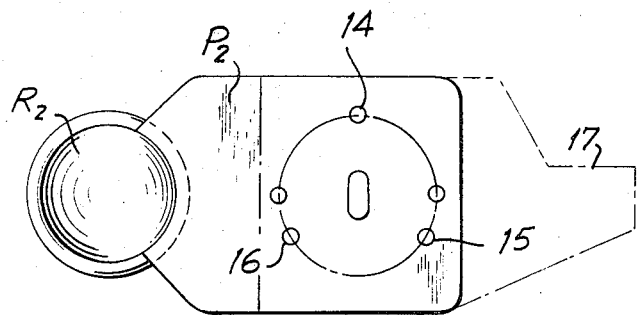
FIG. 6 is a top view of the ball-and-plate member of FIG. 5.

FIGS. 11 and 12 illustrate a simplified embodiment, wherein a ball $R_4$ having substantially the shape of a hemisphere may be secured, as by welding, directly to a plane surface 21, as illustrated in FIG. 13, or to a tubular section, as illustrated in FIG. 14. The tube T of the support may then be welded to the ball $R_4$ as in the preceding Figures while the opposed end of the tube T of FIG. 14 which is not illustrated is fixed to a further ball component in the manner described above. It is to be noted that the tube 22 of FIG. 14 may be any of the tubes of the above-described fixtures such as the tube T of FIG. 1, so that through the use of the component $R_4$ more complex fixtures can be manufactured in accordance with the invention having a number of tubes extending at predetermined angles with respect to each other.

To this end, the ball $R_4$ is of course so cut that its edge corresponding to a circular crown having a width e may be welded to a plane surface and, simultaneously, a curved notch 23 is provided, corresponding to the intersection of a sphere with a cylinder.

Thus, it will be seen that with the structure of the invention the pair of plates $P_1$ and $P_2$ or $P_1$ and $P_3$ form a pair of spaced fastening means for respectively fastening a pair of components at predetermined positions relative to each other and at a predetermined distance from each other. The pair of ball components $R_1$ and $R_2$ together with the tube T, in the case of FIG. 1, or the pair of ball components $R_1$ and $R_3$ and the tube T, in the case of FIG. 8, form in each case a connecting means extending between and fixed to the pair of fastening means for rigidly fastening them to each other so that they will be maintained at a predetermined distance from each other and in predetermined positions relative to each other. This connecting means consists only of the elongated tube T and the pair of ball components such as the ball components $R_1$ and $R_2$ of FIG. 1 or the ball components $R_1$ and $R_3$ of FIG. 8 which respectively have exterior convex surfaces forming parts of spheres and extending into the interior the tube T with this sphere in each ball component having a diameter greater than the diameter of the tube T while the latter has at its opposed ends circular free edges engaging along their entire lengths the exterior convex surfaces of the ball components, with the tube T respectively being welded to the pair of ball components which extend partly into the opposed ends of the tube T at the opposed end edges of the tube T, so that in this way a rigid connecting means consisting only of three components extends between the pair of fastening means. Because the tube T may be situated at an infinite number of angular positions with respect to the pair of ball components before being welded thereto, this connecting means formed by only three components lends itself to the manufacture of a large number of fixtures which are inexpensive to manufacture and which can be used repeatedly for mass production purposes.

Of course, the invention is by no means limited to the forms of embodiment described and illustrated which have been given by way of example only. In particular, it comprises all the means constituting technical equivalents to the means described as well as their combinations, should the latter be carried out according to the spirit of the invention.

What is claimed is:

1. A fixture which is adapted to be used repeatedly for mass production purposes, said fixture comprising a pair of mutually spaced fastening means situated at a predetermined distance from each other and having predetermined positions with respect to each other for respectively fastening a pair of components at a predetermined distance from each other and in predetermined positions relative to each other, and connecting means fixed to and extending between said pair of fastening means for rigidly fastening the latter to each other at said predetermined distance and said predetermined positions relative to each other, said connecting means consisting only of a pair of ball components respectively fixed to said pair of fastening means and an elongated tube extending between said pair of ball components and engaging the latter, said pair of ball components each having an exterior convex surface forming part of a sphere the diameter of which is greater than the diameter of said tube and said pair of ball components respectively extending into said tube at the opposed ends of the latter, said tube having at its opposed ends a pair of circular edges which respectively engage, along their entire lengths, the exterior convex surfaces of said pair of ball components and which are welded to said ball components, so that before a tube of a given length is welded to the exterior convex surfaces of the ball components the tube may be inclined at any desired attitude while maintaining its circular end edges in engagement with the exterior convex surfaces of the ball components.

2. The combination of claim 1 and wherein said pair of fastening means respectively include a pair of plates which are integral with said ball components.

3. The combination of claim 2 and wherein said pair of plates are flat and respectively situated in parallel planes.

4. The combination of claim 2 and wherein said pair of plates are flat and respectively situated in non-parallel planes.

5. The combination of claim 1 and wherein the fastening means fixed to one of said ball components is formed by a free edge of the latter ball component which is adapted to be welded to a further component.

6. The combination of claim 1 and wherein a further ball component is welded to said tube intermediate the ends of the latter while a further tube whose diameter is smaller than the diameter of said further ball component is welded to the latter with the latter ball component having an exterior surface forming part of a sphere whose diameter is greater than that of said further tube and with the latter having a circular free edge welded to the exterior convex surface of said further ball component.

7. The combination of claim 6 and wherein said further ball component has distant from said further tube a free edge the configuration of which matches the exterior surface of said first-mentioned tube at the location where said further component is welded thereto.

8. The combination of claim 1 and wherein said pair of fastening means respectively include a pair of plates integral with said ball components and each formed with openings enabling said pair of plates to be releasably fastened to the components which are to be positioned with respect to each other by the fixture.

* * * * *